May 29, 1945.    L. G. BOWEN    2,376,862
AIRPLANE
Filed April 6, 1942    2 Sheets-Sheet 1
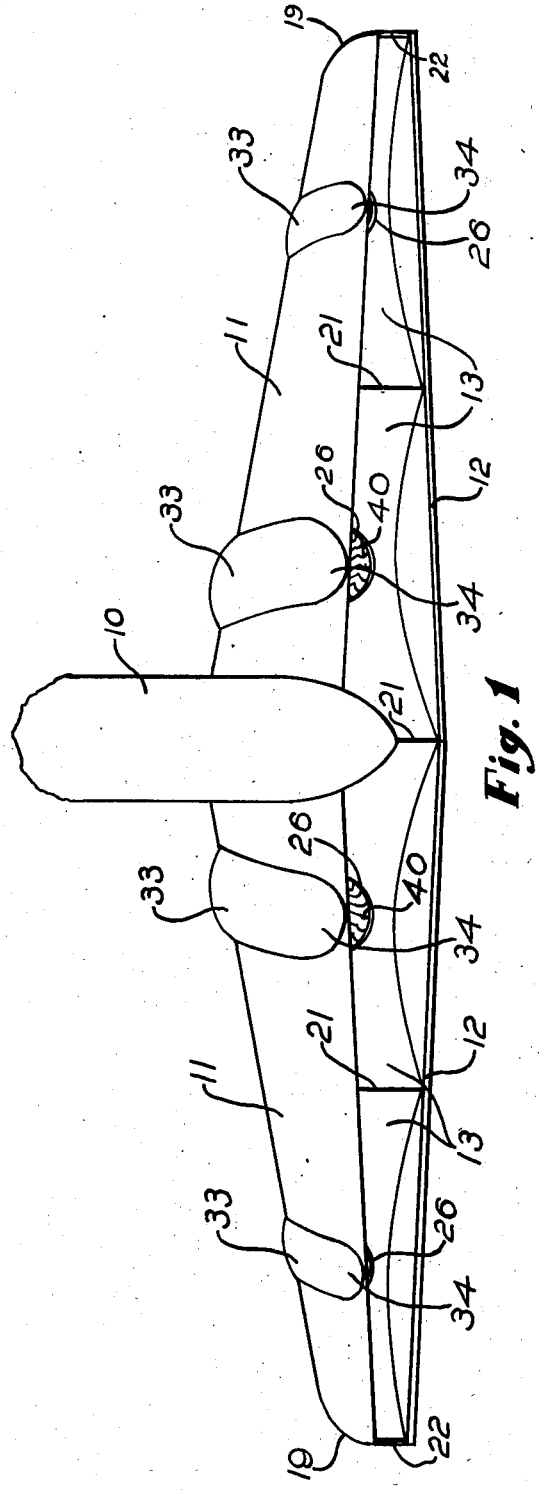
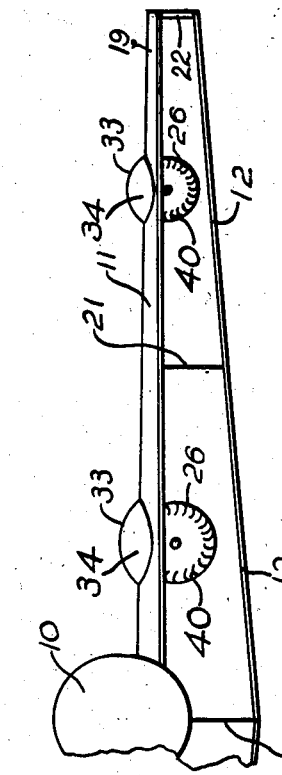
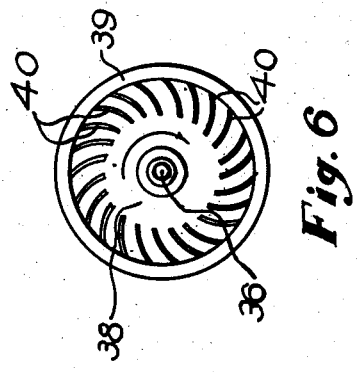
INVENTOR
LESLIE G. BOWEN
BY Alfred R. Fuchs
ATTORNEY

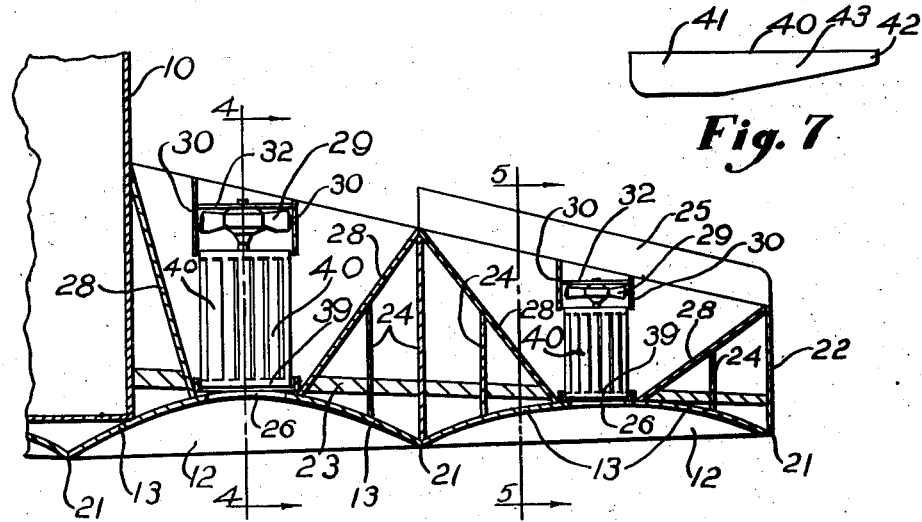
Fig. 7
Fig. 3
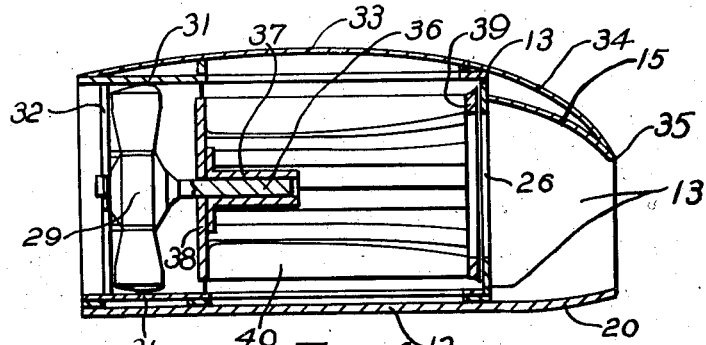
Fig. 4
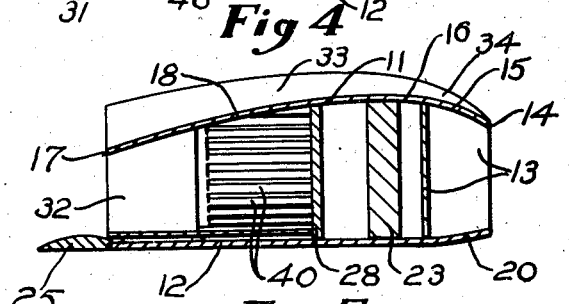
Fig. 5

Patented May 29, 1945

2,376,862

UNITED STATES PATENT OFFICE 2,376,862

AIRPLANE

Leslie G. Bowen, Chicago, Ill.

Application April 6, 1942, Serial No. 437,871

6 Claims. (Cl. 244—15)

My invention relates to airplanes, and more particularly to an airplane that is adapted to fly at extremely high speeds.

The speed of an airplane, even in a power dive, is limited by the thickness of the leading or forward edge of the wing, or wings, of the plane. The lifting power of the airplane is dependent upon the pitch or slope of the top surface of the wing from the thickest portion thereof, to the rear or trailing edge of the wing. Obviously there is a limit for any load capacity and any power plant provided for both of these factors; for if the forward edge or leading edge of the wing is made extremely thin in order to get increased speed, the slope or pitch of the inclined lifting top surface of the wing has to be decreased to an extent that it will not lift the airplane and its load off the ground. Accordingly it has been stated by engineers familiar with airplane design that there is an absolute limit of speed that can be attained in an airplane, even in a power dive, as the wind resistance will become so great at higher speeds on the forward or leading edge of the wing that the combined effect of the propelling mechanism including the engines and the action of the force of gravity, in a power dive, will not be capable of exceeding that apparent limiting speed. The resistance of the air exerted on the forward or leading edge of the wing, or wings, of an airplane results from the tremendous air pressures built up on or adjacent said forward edge, due to the rapid movement of the airplane through the air. It is a purpose of my invention to eliminate this pressure by providing propelling means for the airplane that will create a suction along the entire leading edge of the wing, or wings, to counteract and eliminate the retarding effect of the pressure ordinarily existing on and adjacent the forward edge of the wing, or wings, of an airplane.

It is a further purpose of my invention to provide an airplane with suction creating means, comprising a rotor having a multiplicity of blades thereon, which are relatively long in the direction of the axis of rotation and relatively short in a direction transverse to the axis of rotation, which means is mounted in a housing of the character of a wind tunnel, which has its entrance end adjacent the forward or leading edge of the wing on which the same is mounted, and which is provided with means for distributing the suction created at the inlet end of said housing means over a large area of the leading edge of the wing on both sides of the inlet to said suction creating means. A plurality of said devices is provided so that the suction created thereby will be distributed over substantially the entire forward or leading edge of the wing of the airplane.

It is a further purpose of my invention to provide, in a device of the above mentioned character, means for discharging the air from the rotor and directing the air so discharged rearwardly, so that air under high velocity and under pressure will be discharged from said housing means rearwardly of the rotor and at substantially the rear edge or trailing edge of the wing over a wide area, said suction at the forward or leading edge of the wing, and the pressure created backward of said forward or leading edge substantially at the rear or trailing edge of the wing, cooperating to move the airplane forwardly at high speed through the air.

As the pressure or wind resistance at the leading edge of the wing can thus be controlled, it will be obvious that the wing can be so designed that the same will have much greater lifting power than would be otherwise possible, which enables a greater load to be carried or a power plant of greater capacity to be provided, inasmuch as the capacity of the power plant is dependent upon the weight thereof, so that sufficient power can be provided to eliminate the air pressure ordinarily existing on the leading edge of the wing, by providing suitable rotating suction creating means and means for rotating the same at such a speed as to create the desired suction to eliminate said pressure.

It is a further purpose of my invention to provide rotatable suction creating means of the type commonly known as a sirocco, which comprises a multiplicity of blades that are so curved and so arranged relative to the direction of rotation of the rotor as to draw the air outwardly from the axis of rotation of the rotor and expel the air from the rotor substantially centrifugally into the space surrounding the rotor; and to provide blades of suitable shape for said rotor that the highest efficiency can be obtained therefrom throughout the length thereof. Furthermore it is an important purpose of my invention to provide means for directing the centrifugally disposed air rearwardly in a fan-like stream toward the rear or trailing edge of the wing.

Other objects and advantages of my invention will appear as the description of the drawings proceeds. I desire to have it understood, however, that I do not intend to limit myself to the particular details shown or described, except as defined in the claims.

In the drawings:

Fig. 1 is a perspective view of the wings and fuselage, partly broken away, of an airplane embodying my invention.

Fig. 2 is a front elevational view of an airplane showing my improved wing construction, a portion thereof being broken away.

Fig. 3 is a horizontal sectional view on an enlarged scale through one wing and a portion of the fuselage of my improved airplane.

Fig. 4 is a section taken on the line 4—4 of Fig. 3 on a still larger scale.

Fig. 5 is a section taken on the line 5—5 of Fig. 2.

Fig. 6 is a front elevational view of the rotor used as a propeller in my invention, and Fig. 7 is an elevational view of one of the rotor blades detached.

Referring in detail to the drawings, my improved airplane is provided with a fuselage 10, which is merely shown in outline, as the construction thereof is not particularly of importance to the invention, and a wing structure having a top wall 11, a bottom wall 12 and curved forward wall portions 13. The top wall 11 curves upwardly from the forward edge 14 thereof, as indicated at 15, to a point of maximum height 16 and then inclines downwardly to the rear edge 17 thereof, the inclined portion being indicated by the numeral 18 and being substantially plane toward the rear thereof and meeting the curved forward portion 15 in a gradual curve. The particular curvature, or slope, of the surfaces is only illustrative, as this is a matter of design, which can be varied considerably, but the general characteristics of the top wall would be substantially as shown, so that the top surface of airplane wings made in accordance with my invention would be similar in character to those of conventional wings of airplanes. Also the top walls 11 slope downwardly from the outer edges or tips 19 of the wings toward the fuselage 10, as will be evident from Fig. 2.

The bottom wall 12 is made substantially flat or planar throughout its area, except at the forward end thereof where the same may be slightly upwardly sloped, as shown at 20 in Figs. 4 and 5. Thus the bottom surface of the wall 12 will conform substantially to the bottom surface of a conventional airplane wing. The walls 12, however, slope downwardly from the extremities or tips 19 of the wings to the center line of the airplane in a customary manner. It will be noted, however, that the walls 11 and 12 are widely spaced, and instead of bringing said walls together in a smooth curve at the forward edges thereof to form the forward or leading edge of the wing, a forward wall made up of the sloping wall portions 13 is provided, which slope inwardly from a plurality of apexes 21, the outer ends or tips of the wings being closed by walls 22, as will be obvious from Fig. 2. The wings will, of course, be braced by longitudinal and transverse bracing members, which are so arranged as to permit the provision of suitable passages and motor and sirocco mountings forming part of my invention, as will be described below. The particular location and character of the bracing members are a matter of engineering skill and are only shown conventionally as a longitudinal bracing member 23 and transverse bracing members 24 in the drawings. Also ailerons are provided of suitable design and extent, one thereof being shown at 25 in Figs. 3 and 5, these being controlled in the usual manner and being shown as being hinged on the bottom wall 12 of the wing, although obviously the same could be mounted between the bottom and top walls at the rear or trailing edge of a wing, or both at the top and bottom walls, as may be found desirable.

The concavely curved walls 13 are provided at their innermost portions with openings 26, which are of such size or cross sectional area that at the desired speed or rotation of the suction creating means, to be described below, suction will be created over the entire curved area 13 between one apex 21 and the next apex 21, each opening 26 being sufficient to create the desired suction within the space defined by the upper face of the curved wall 20 and the underface of the curved wall 15 and the walls 13 between each pair of apexes 21.

Within the wing between the walls 11 and 12 diverging walls 28 are provided, said diverging walls receding from each other from the walls 13 to the rear edge portion of the wing, so as to form gradually widening passages extending from just rearwardly of the wall 13 to the rear or trailing edge of the wing, there being one such widening passage for each opening 26. Mounted within each of said widening passages in axial alignment with the opening 26 is a motor 29, said motor being of a size suitable for driving the rotor that creates the suction appropriate for the particular opening 26 with which the motor 29 is aligned. Any suitable mounting means, such as the frame members 30 and 31, may be provided for mounting the motors, the motors being customarily mounted on rings 32 carried by the framework, so that the stream of air that is created, which passes rearwardly through the widening passage between each pair of walls 28 to the rear or trailing edge of the wing, can pass between the engine cylinders to provide for the cooling thereof. The particular type of engine is not a part of my invention, and is only shown conventionally. In order to provide sufficient space for the rotor and the necessary air passage surrounding the same, the top wall 11 is provided with a plurality of upwardly bowed transversely and longitudinally curved portions 33, which form part of the housing for the rotor and constitute part of the air passage or wind tunnel associated with each rotor. Said wall portions 33 are, preferably, extended forwardly beyond the wall 13 to provide the downwardly curved forward end portions 34 meeting the curved wall portions 15 at 35, so as to provide for streamlining said upwardly bowed portions 33 at the forward ends thereof, said walls 34 also serving to brace the walls 11 at the greatest projection thereof beyond the wall 13.

Referring to Fig. 3 it will be noted that the engine or motor 29 is provided with a relatively long shaft 36 on which is mounted a long sleeve-like member 37 fixed on the end wall 38 of the suction creating rotor or sirocco member, said sleeve-like member 37 being fixed to the shaft 36 and serves to provide a suitable support for the rotor without providing any bearings at the end thereof remote from the engine, although obviously suitable bearing means could be provided therefor if this should be found desirable.

Spaced from the imperforate wall or disk-like member 38 is a ring-like member 39, and between said ring-like member 39 and the disk-like member 38 is mounted a multiplicity of blades 40 defining slots between the same. Said blades are of a concavo-convex character, as will be obvious from Fig. 6, and the concave sides thereof are so arranged relative to the direction of rotation that as the same are rotated rapidly by rotation of the shaft 36 by the engine 29 these will pick up the air from the inner edges thereof, that is, those nearest the center of rotation of the rotor, and will throw the air toward the outer edges thereof or those remote from the axis of rotation of the rotor, or substantially centrifugally, so that as the rotor rotates in the direction indicated by the arrow in Fig. 6, air will be thrown outwardly substantially radially in all directions from the rotor into the passage defined by the walls 28, the wall 12, and the wall 11 with the upwardly curved portions 33. Due to the taper of the walls 28 the direction of the air currents thus created will be changed from a centrifugal direction to one generally rearwardly toward the trailing edge of the wing, the air discharging from the outer surface of the rotor between the blades 40 will be discharged at a high pressure and high velocity, and this pressure and velocity will be maintained throughout the passage between the walls above referred to and the air at such pressure and velocity as referred to will be discharged at the rear edge portions of the wing in a substantially uniform stream from the wing tips 19 to the fuselage 10.

Due to the rapid rotation of the rotor and the fact that it is of considerably greater length axially than its diameter, there will be a tendency to reduce the density of the air tremendously in an axial direction inwardly from the opening 26 to the wall 38 and in order to have the blades 40 operate at full efficiency, so that all portions thereof from the forward to the rear edge of each blade will be discharging substantially the same volume of air into the passage surrounding the rotor, said blades are, preferably, provided with a wider portion 41 adjacent the wall 38 and a narrower portion 42 adjacent the ring 39 connected by a gradually widening portion 43 extending from substantially the forward edge of each blade to the widened portion 41, which extends a substantial distance forwardly from the rear edge of each blade, (by forward and rear edges being meant those nearest the front or rear of the rotor).

It will accordingly be seen that by the use of my invention, the pressure ordinarily existing on the forward or leading edge of an airplane wing is eliminated by the suction created by my high speed rotative suction creating means and that the suction that is thus created can be determined definitely by the design of the rotor and the size of the engine or power plant, and that the means for propelling the plane includes also means for reducing or eliminating the wind resistance or air pressure on the forward or leading edge of the wing, thus making it possible to obtain higher speeds than can be obtained by mere wing design with the use of propellers driven by the engine or power plant in free or open air.

What I claim is:

1. In an airplane, a wing having spaced imperforate top and bottom walls having straight leading edges defining the leading edge of said wing, said top wall sloping upwardly away from said bottom wall from the leading edge thereof to a point near but spaced backwardly from said leading edge and downwardly toward said bottom wall from said point to the trailing edge of said top wall, a forward wall adjacent the leading edges of said walls connecting said top and bottom walls and having air inlet openings therein, said wall comprising inwardly curved portions extending from spaced forward points substantially at the leading edges of said top and bottom walls to said inlet openings to provide passages having forward open ends collectively co-extensive with substantially the entire leading edge of said wing narrowing to the cross section of said inlet opening at the rear ends thereof, walls extending between said top and bottom walls and gradually diverging from said forward wall at said openings to the trailing edges of said top and bottom walls to provide gradually rearwardly widening air passages extending from said inlet openings to the trailing edge of said wing, and propelling means for said airplane in said passages creating suction at said inlet openings, all the air moved by said propelling means passing through said inlet openings and being discharged at the trailing edge of said wing under positive pressure.

2. In an airplane, a wing having spaced imperforate top and bottom walls having straight leading edges defining the leading edge of said wing, said top wall sloping upwardly away from said bottom wall from the leading edge thereof to a point near but spaced backwardly from said leading edge and downwardly toward said bottom wall from said point to the trailing edge of said top wall, a forward wall adjacent the leading edges of said walls connecting said top and bottom walls and having air inlet openings therein, said wall comprising inwardly curved portions extending from spaced forward points substantially at the leading edges of said top and bottom walls to said inlet openings to provide passages having forward open ends collectively co-extensive with substantially the entire leading edge of said wing narrowing to the cross section of said inlet opening at the rear ends thereof, walls extending between said top and bottom walls and gradually diverging from said forward wall at said openings to the trailing edges of said top and bottom walls to provide gradually rearwardly widening air passages extending from said inlet openings to the trailing edge of said wing, said rearwardly widening passages having rear open ends collectively co-extensive with substantially the entire trailing edge of said wing, and propelling means for said airplane in said passages creating suction at said inlet openings, all the air moved by said propelling means passing through said inlet openings and being discharged at the trailing edge of said wing under positive pressure.

3. In an airplane, a wing having spaced imperforate top and bottom walls having straight leading edges defining the leading edge of said wing, said top wall sloping upwardly away from said bottom wall from the leading edge thereof to a point near but spaced backwardly from said leading edge and downwardly toward said bottom wall from said point to the trailing edge of said top wall, a forward wall adjacent the leading edges of said walls connecting said top and bottom walls and having air inlet openings therein, said wall comprising inwardly curved portions extending from spaced forward points substantially at the leading edges of said top and bottom walls to said inlet openings to provide passages having forward open ends collectively co-extensive with substantially the entire leading edge of said wing narrowing to the cross section of said inlet opening at the rear ends thereof, walls extending between said top and bottom walls and gradually diverging from said forward wall at said openings to the trailing edges of said top and bottom walls to provide gradually rearwardly widening air passages extending from said inlet openings to the trailing edge of said wing, and propelling means for said airplane consisting of bladed rotors mounted entirely within said rearwardly widening passages, and means for rotating said rotors, the blades of said rotors being directed to draw air substantially axially into said rotors solely through said inlet openings from the leading edge of said wing at the forward ends of said rotors and discharge air into said rearwardly widening passages substantially centrifugally of the peripheries of said rotors, whereby all the air moved by said propelling means passes through said inlet openings and is discharged at the trailing edge of said wing under positive pressure.

4. In an airplane, a wing having spaced imperforate top and bottom walls having straight leading edges defining the leading edge of said wing, said top wall sloping upwardly away from said bottom wall from the leading edge thereof to a point near but spaced backwardly from said leading edge and downwardly toward said bottom wall from said point to the trailing edge of said top wall, a forward wall adjacent the leading edges of said walls connecting said top and bottom walls and having air inlet openings therein, said wall comprising inwardly curved portions extending from spaced forward points substantially at the leading edges of said top and bottom walls to said inlet openings to provide passages having forward open ends collectively co-extensive with substantially the entire leading edge of said wing narrowing to the cross section of said inlet opening at the rear ends thereof, walls extending between said top and bottom walls and gradually diverging from said forward wall at said openings to the trailing edges of said top and bottom walls to provide gradually rearwardly widening air passages extending from said inlet openings to the trailing edge of said wing, said rearwardly widening passages having rear open ends collectively co-extensive with substantially the entire trailing edge of said wing, and propelling means for said airplane consisting of bladed rotors mounted entirely within said rearwardly widening passages, and means for rotating said rotors, the blades of said rotors being directed to draw air substantially axially into said rotors solely through said inlet openings from the leading edge of said wing at the forward ends of said rotors and discharge air into said rearwardly widening passages substantially centrifugally of the peripheries of said rotors, whereby all the air moved by said propelling means passes through said inlet openings and is discharged at the trailing edge of said wing under positive pressure.

5. In an airplane, a wing having spaced imperforate top and bottom walls having straight leading edges defining the leading edge of said wing, said top wall sloping upwardly away from said bottom wall from the leading edge thereof to a point near but spaced backwardly from said leading edge and downwardly toward said bottom wall from said point to the trailing edge of said top wall, a forward wall adjacent the leading edges of said walls connecting said top and bottom walls and having air inlet openings therein, said wall comprising inwardly curved portions extending from spaced forward points substantially at the leading edges of said top and bottom walls to said inlet openings to provide passages having forward open ends collectively co-extensive with substantially the entire leading edge of said wing narrowing to the cross section of said inlet opening at the rear ends thereof, walls extending between said top and bottom walls and gradually diverging from said forward wall at said openings to the trailing edges of said top and bottom walls to provide gradually rearwardly widening air passages extending from said inlet openings to the trailing edge of said wing, and propelling means for said airplane consisting of bladed rotors mounted entirely within said rearwardly widening passages, the forward ends of said rotors being immediately adjacent and substantially co-extensive with said inlet openings, and means for rotating said rotors, the blades of said rotors being directed to draw air substantially axially into said rotors solely through said inlet openings from the leading edge of said wing at the forward ends of said rotors and discharge air into said rearwardly widening passages substantially centrifugally of the peripheries of said rotors, whereby all the air moved by said propelling means passes through said inlet openings and is discharged at the trailing edge of said wing under positive pressure.

6. In an airplane, a wing having spaced imperforate top and bottom walls having straight leading edges defining the leading edge of said wing, said top wall sloping upwardly away from said bottom wall from the leading edge thereof to a point near but spaced backwardly from said leading edge and downwardly toward said bottom wall from said point to the trailing edge of said top wall, a forward wall adjacent the leading edges of said walls connecting said top and bottom walls and having air inlet openings therein, said wall comprising inwardly curved portions extending from spaced forward points substantially at the leading edges of said top and bottom walls to said inlet openings to provide passages having forward open ends collectively co-extensive with substantially the entire leading edge of said wing narrowing to the cross section of said inlet opening at the rear ends thereof, walls extending between said top and bottom walls and gradually diverging from said forward wall at said openings to the trailing edges of said top and bottom walls to provide gradually rearwardly widening air passages extending from said inlet openings to the trailing edge of said wing, said rearwardly widening passages having rear open ends collectively co-extensive with substantially the entire trailing edge of said wing, and propelling means for said airplane consisting of bladed rotors mounted entirely within said rearwardly widening passages, the forward ends of said rotors being immediately adjacent and substantially co-extensive with said inlet openings, and means for rotating said rotors, the blades of said rotors being directed to draw air substantially axially into said rotors solely through said inlet openings from the leading edge of said wing at the forward ends of said rotors and discharge air into said rearwardly widening passages substantially centrifugally of the peripheries of said rotors, whereby all the air moved by said propelling means passes through said inlet openings and is discharged at the trailing edge of said wing under positive pressure.

LESLIE G. BOWEN.